United States Patent [19]

College et al.

[11] Patent Number: 4,626,418

[45] Date of Patent: Dec. 2, 1986

[54] REMOVAL OF $SO_2$ FROM $SO_2$-CONTAINING GASES

[75] Inventors: John W. College, Oakdale, Pa.; Joseph Vlnaty, Ruskin, Fla.

[73] Assignee: Dravo Corporation, Pittsburgh, Pa.

[21] Appl. No.: 780,416

[22] Filed: Sep. 26, 1985

[51] Int. Cl.$^4$ .......................... B01J 8/00; C01B 17/00
[52] U.S. Cl. .................................... 423/243; 423/244
[58] Field of Search .............. 423/244 A, 244 R, 243, 423/242 A, 242 R

[56] References Cited

U.S. PATENT DOCUMENTS

| | | | |
|---|---|---|---|
| 2,225,744 | 12/1940 | Johnstone | 423/243 |
| 4,246,245 | 1/1981 | Abrams et al. | 423/242 |
| 4,409,192 | 10/1983 | Lichtner et al. | 423/242 |
| 4,423,018 | 12/1983 | Lester et al. | 423/243 |

FOREIGN PATENT DOCUMENTS 1191793  4/1965  Fed. Rep. of Germany ...... 423/243

*Primary Examiner*—Gregory A. Heller
*Attorney, Agent, or Firm*—Parmelee, Miller, Welsh & Kratz

[57] ABSTRACT

A process for the removal of $SO_2$ from a gaseous mixture containing $SO_2$ which comprises contacting said gaseous mixture containing $SO_2$ with a mixture containing a sugar and at least one alkaline earth compound selected from the group consisting of calcium and magnesium carbonates, oxides and hydroxides.

22 Claims, No Drawings

REMOVAL OF SO$_2$ FROM SO$_2$-CONTAINING GASES

FIELD OF THE INVENTION

The present invention is directed to a process for the removal of SO$_2$ from SO$_2$-containing gases which comprises contacting the same with a mixture containing a sugar and at least one alkaline earth compound, selected from the group consisting of calcium and magnesium carbonates, oxides and hydroxides.

BACKGROUND OF THE INVENTION

It is well known that when a wide variety of fossil fuels and metal ores are subjected to oxidation, for example, by burning, gaseous products are obtained containing SO$_2$. SO$_2$ itself, and products resulting therefrom, such as sulfurous acid and sulfuric acid, are serious pollutants and therefore are environmentally undesirable. It is common, therefore, to remove SO$_2$ from such gases before they are discharged into the environment. One procedure for accomplishing this result involves contacting gaseous mixtures containing SO$_2$ with alkaline earth compounds. Even though alkaline earth compounds are effective for this purpose, and their cost is small, their use would still be further enhanced if their ability to remove SO$_2$ from gaseous mixtures containing SO$_2$ could be improved.

The following are illustrative of procedures that have been used to remove SO$_2$ from gaseous mixtures containing SO$_2$. In U.S. Pat. No. 4,246,245, dated Jan. 30, 1981, Abrams, et al. remove SO$_2$ from gases containing the same by contacting them with a Type S hydrated lime, which is a calcined dolomite hydrated in an autoclave at pressures of about 25 to 100 psi and temperatures of about 250° to 400° F., using either a wet or dry scrubbing process. In U.S. Pat. No. 4,409,192, which issued Oct. 11, 1983, Lichtner, et al. remove SO$_2$ from flue gases by contacting the same with an aqueous mdium containing a water-soluble sulfonated polystyrene, an organo-phosphonate and a material which will react with the sulfur dioxide to form calcium sulfate or calcium sulfite and then separating the insoluble calcium products from the aqueous medium. Lester, Jr., et al. in U.S. Pat. No. 4,423,018, dated Dec. 27, 1983, contact a flue gas to remove SO$_2$ therefrom using an aqueous solution or slurry of limestone or lime buffered with a byproduct stream obtained from the production of adipic acid from cyclohexane containing glutaric acid, succinic acid and adipic acid. None of these reference teaches or suggests, singly or in combination, the novel process herein, wherein removal of SO$_2$ from SO$_2$-containing gases is effected by contact with a mixture containing at least one alkaline earth compound selected from the group consisting of calcium and magnesium carbonates, oxides and hydroxides and sugar.

SUMMARY OF THE INVENTION

We have found that in a process wherein a gaseous mixture containing SO$_2$ is contacted with an alkaline earth compound for the purpose of removing SO$_2$ therefrom, the amount of SO$_2$ removed from the gaseous mixture is appreciably increased if such gaseous mixture is contacted with a mixture containing at least one alkaline earth compound selected from the group consisting of calcium and magnesium carbonates, oxides and hydroxides, and also containing sugar.

Any gaseous mixture containing SO$_2$ can be treated in accordance with our invention to remove SO$_2$ therefrom. In general, however, the gaseous mixtures containing SO$_2$ that are treated herein are those resulting from the oxidation, for example, burning, of fossil fuels, such as coal and petroleum oils, and metal ores. These gaseous mixtures can contain, for example, on a volume basis, from about 8 to about 20 percent carbon dioxide, about 2 to about 12 percent oxygen, about 0.15 to about 0.35 percent SO$_2$, very small amounts of nitrogen oxides, and the remainder being substantially nitrogen.

In accordance with the process defined and claimed herein, the above gaseous mixture is contacted with a mixture containing at least one of the alkaline earth compounds defined above and a sugar to remove SO$_2$ therefrom.

By "sugar" we mean to include any carbohydrate having a chain of 2 to 7 carbon atoms, usually 5 or 6 carbon atoms, with one of the carbon atoms carrying aldehydic or ketonic oxygen which may be combined in acetal or ketal forms and the remaining carbon atoms usually bearing hydrogen atoms and hydroxyl groups. See, for example, Encyclopedia of Chemistry, Reinhold Publishing Corp., New York, N.Y., 1957, pages 900 to 903. Some of these sugars can be monosaccharides, while others can be coupled into di-, tri- and higher saccharides. Examples of sugars that can be used herein are the monosaccharides, such as glucose and fructose, and the higher saccharides, such as sucrose, maltose and lactose. Mixtures of sugars can also be used.

As noted the sugar, or mixtures of sugars, are used with at least one alkaline earth compound selected from the group consisting of calcium and magnesium carbonates, oxides and hydroxides. Thus, we intend to include calcium carbonate, calcium oxide, calcium hydroxide, magnesium carbonate, magnesium oxide and magnesium hydroxide alone, as well as mixtures thereof. An example of a mixture which can be used herein is dolomite, which is a mixture containing calcium carbonate and magnesium carbonate. The amount of sugar present in admixture with the above-defined alkaline earth compound, based on the total weight of the two, can be from about 0.01 to about 12 weight percent, but generally will be in the range of about 0.05 to about 2 weight percent.

Any suitable or convenient procedure can be used to obtain the mixture of alkaline earth compound and sugar used herein. One procedure involves physically mixing the alkaline earth compound or mixtures of such compounds and sugar in their solid forms in the amounts defined above until a substantially homogenous particulate mixture is obtained. Another procedure that can be used involves dissolving the sugar in water, for example, at room temperature, then adding the required amount of alkaline earth compound to the resulting solution, drying the resulting slurry, without removing water of hydration, until a mixture of solids having a constant weight is obtained. In still another procedure, sugar is dissolved in water, the resulting solution is passed through a steam generator, wherein the water is converted to steam, and the alkaline earth compound is then added to the resulting gaseous mixture. The resulting product can be used, as such, to treat the gaseous mixture containing SO$_2$, or it can be cooled to room temperature, water can be removed therefrom, as above, and the resulting dry mixture can be used to treat the gaseous mixture containing SO$_2$. Still another procedure for preparing the mixture involves passing water through a steam generator to obtain steam, adding the required amounts of alkaline earth compound and sugar to the steam and then using the resulting product to treat the gaseous mixture containing $SO_2$, or cooling the resulting mixture to room temperature, after which water can be removed therefrom, as above, and the resulting dry mixture can be used to treat the gaseous mixture containing $SO_2$. The latter two procedures are extremely attractive for purposes of preparing the mixture of alkaline earth compound and sugar, since the sugar will more effectively coat the hydrated alkaline earth compound. After preparation of a solid mixture of alkaline earth compound and sugar, it is preferably ground into particulate form having an average diameter below about 180 microns, generally in the range of about 2 to about 80 microns. By "alkaline earth compound-sugar mixture" we mean to include compositions containing discrete particles of the defined alkaline earth compound and sugar as well as any chemical reaction products resulting from the contact of the defined alkaline earth compound, sugar and water with each other.

The gaseous mixture to be treated herein can be contacted with the alkaline earth compound-sugar mixture immediately upon leaving the burner, but preferably, for example, when fossil fuels are burned, after the gaseous mixture is passed through a heat exchanger or boiler, wherein steam is generated, and the gaseous mixture is then at a reduced temperature level. Thus, the gaseous mixture containing $SO_2$ can be treated when said gaseous mixture is in the range of about 100° to about 2400° F., preferably about 100° to about 900° F. The gaseous mixture being treated can be at any pressure level, but generally will be at about atmospheric pressure.

The amount of alkaline earth compound-sugar mixture used to treat the gaseous mixture containing $SO_2$ will be in an amount such that the mols of the alkaline earth compound component thereof in the mixture relative to the $SO_2$ in the gaseous mixture being treated will be in the range of about 0.5:1 to about 3:1, preferably about 1:1 to about 2:1.

Treatment of the gaseous mixture containing $SO_2$ can be effected in any convenient or suitable matter as long as effective contact is maintained between the gaseous mixture and the alkaline earth compound-sugar mixture. One procedure involves dry spray injection of the latter mixture into a flowing stream of a gaseous mixture containing $SO_2$. The resulting gas stream is then passed to any suitable separating means, for example, a filter, wherein particulates, such as the alkaline earth compound-sugar mixture, fly ash, etc., are separated and a gaseous mixture having a substantially reduced $SO_2$ content is obtained. Another procedure that can be used involves passing the gaseous stream containing $SO_2$ through a fluid bed containing the alkaline earth compound-sugar mixture, removing a gaseous stream therefrom, separating from said latter gaseous stream entrained particulate material and recovering a gaseous stream having a substantially reduced $SO_2$ content. Still another procedure that can be used involves passing the gaseous stream containing $SO_2$ through a fixed bed containing the alkaline earth compound-sugar mixture, removing a gaseous stream therefrom, separating from said latter gaseous stream entrained particulate material and recovering a gaseous stream having a substantially reduced $SO_2$ content. The amount of time required for the alkaline earth compound-sugar mixture to remove $SO_2$ from the gaseous stream containing $SO_2$ is extremely short, for example, less than about 5 seconds, generally within about 1 to about 2 seconds. Longer contact times can be used without adverse effects, but are not necessary.

DESCRIPTION OF PREFERRED EMBODIMENTS

The following illustrates the effectiveness of the mixture containing the alkaline earth compound and sugar in removing $SO_2$ from a gaseous stream containing $SO_2$.

Example I

A mixture containing an alkaline earth compound and sugar was prepared by mixing a mixture containing 7 weight percent $Mg(OH)_2$, 85 weight percent $Ca(OH)_2$, with the remainder being inerts, with table sugar (sucrose) in an amount such that the resulting mixture contained 10 weight percent sugar. The resulting mixture was ground to obtain particles having an average diameter of 5 to 10 microns. The gaseous mixture treated contained 1630 parts per million of $SO_2$ (0.163 volume percent), 6 volume percent of oxygen, 12 volume percent of carbon dioxide and substantially all of the remainder was nitrogen. To this gaseous mixture, which was at a temperature of 256° F. and atmospheric pressure, and was flowing through a pipe having an internal diameter of 8 inches at the rate of 115 cubic feet per minute, there was continuously added the above mixture containing $Mg(OH)_2$, $Ca(OH)_2$ and sugar at a rate such that 2 mols of the mixture containing $Mg(OH)_2$ and $Ca(OH)_2$ were added per mol of $SO_2$ in the gaseous mixture. The treated gaseous stream was passed through a filter to remove particulate material and then analyzed about 100 feet downstream from the point of introduction of the mixture containing $Mg(OH)_2$, $Ca(OH)_2$ and sugar into the gaseous stream. The contact time between the gaseous mixture and the mixture containing $Mg(OH)_2$, $Ca(OH)_2$ and sugar was about 2½ seconds. The treated as stream was found to contain 800 parts per million of $SO_2$ (0.08 volume percent).

The above run was repeated, except no sugar was present with the mixture containing $Mg(OH)_2$ and $Ca(OH)_2$ when it was injected into the gaseous stream containing $SO_2$. The treated gas was found to contain 1275 parts per million of $SO_2$ (0.1275 volume percent).

Thus, while only about 22 percent of the $SO_2$ was removed from the gaseous mixture containing $SO_2$ using the mixture containing $Mg(OH)_2$ and $Ca(OH)_2$ alone, the additional presence of sugar in the combination resulted in the removal from the gaseous mixture of almost 51 percent of the $SO_2$, an improvement of about 130 percent.

Example II

A number of runs were carried out wherein a gaseous mixture containing 3000 parts per million of $SO_2$ (0.30 volume percent), 3 volume percent $O_2$, 16 volume percent carbon dioxide, with remainder being nitrogen, was passed upwardly through a fixed bed containing alkaline earth compounds alone or in an admixture with sugar. The mixture containing the alkaline earth compounds and sugar used in this example was prepared by dissolving sugar in water at room temperature, the same mixture of $Mg(OH)_2$ and $Ca(OH)_2$ used in Example I was added thereto, the resulting slurry was dried to constant weight, without losing water of hydration, crushed and then passed over an 80-mesh screen. In order to inhibit channeling through the beds, the contents thereof were mixed with an equal volume of glass beads having an average diameter of about 4 millimeters. In all cases the total amount of the mixture containing Mg(OH)$_2$ and Ca(OH)$_2$ present in the reactor was 1.6 grams. In the base runs no sugar was present in the reactor bed, while in others the amount of sugar present was either 0.1 or 1.0 weight percent of the total mixture. The temperatures were maintained at 400° F., 750° F. or 850° F. and the time of operation was either 80 minutes or 160 minutes. The results obtained are summarized below in Table I:

TABLE I

| Run No. | Weight percent sugar | Temperature of Bed °F. | Time of Operation, Minutes | Weight Percent Sulfur in Reactor Contents at End of Designated Time |
|---|---|---|---|---|
| 1 | 0 | 400 | 80 | 1.80 |
| 2 | 0.1 | 400 | 80 | 2.50 |
| 3 | 1.0 | 400 | 80 | 2.18 |
| 4 | 0 | 400 | 160 | 2.91 |
| 5 | 0.1 | 400 | 160 | 3.08 |
| 6 | 1.0 | 400 | 160 | 2.91 |
| 7 | 0 | 750 | 80 | 2.52 |
| 8 | 0.1 | 750 | 80 | 3.30 |
| 9 | 1.0 | 750 | 80 | 2.42 |
| 10 | 0 | 850 | 80 | 2.07 |
| 11 | 0.1 | 850 | 80 | 3.91 |
| 12 | 1.0 | 850 | 80 | 2.70 |

The above data clearly show that the presence of sugar during the process appreciably enhances the ability of the alkaline earth compounds to remove SO$_2$ from a gaseous stream containing SO$_2$. The data further show that the ability of the mixture containing the alkaline earth compounds and sugar to remove SO$_2$ is related to the amount of sugar present and the temperature of treatment. It would appear that under the conditions of this example best results are obtained when the mixture contains 0.1 weight percent sugar, for in each such case the amount of SO$_2$ removed at the end of the designated periods was highest. Thus, in Run No. 1, with no sugar present but only alkaline earth compounds, at the end of 80 minutes of operation the alkaline earth compounds in the bed contained 1.80 weight percent sulfur. When 0.1 weight percent sugar was also present in the mixture in Run No. 2, the amount of sulfur in the mixture was greatly increased to 2.50 weight percent at the end of the run. However, in Run No. 3, increasing the amount of sugar resulted in a decline in the amount of sulfur in the mixture, although still an improvment over the use of the alkaline earth compounds alone in Run No. 1. The remaining runs follow a somewhat similar pattern. Thus, even though in Runs Nos. 6 and 9, the amounts of sulfur in the mixture at the end of the runs were no greater than in base Runs Nos. 4 and 7, respectively, that merely suggests carrying out the operation with less sugar in the mixture containing alkaline earth compounds and sugar or under more productive reaction conditions. It should be pointed out that while the mixture containing the alkaline earth compounds and sugar in Example I contained 10 weight percent sugar, and excellent results were obtained at a temperature of 256° F., for purpose of economy mixtures containing lesser amounts of sugar, for example, about 0.1 weight percent, at the lower temperatures are preferred.

Obviously, many modifications and variations of the invention, as hereinabove set forth, can be made without departing from the spirit and scope thereof, and therefore only such limitations should be imposed as are indicated in the appended claims.

We claim:

1. A dry process for the removal of SO$_2$ from a gaseous mixture containing SO$_2$ which comprises contacting said gaseous mixture containing SO$_2$ with a mixture containing at least one alkaline earth compound selected from the group consisting of calcium and magnesium carbonates, oxides and hydroxides and from about 0.01 to about 12 weight percent sugar at a temperature in the range of about 100° to about 2400° F., with the mols of said alkaline earth compound relative to the mols of SO$_2$ in said gaseous mixture being in the range of about 0.5:1 to about 3:1.

2. The process of claim 1 wherein said gaseous mixture contains SO$_2$, oxygen, carbon dioxide and nitrogen.

3. The process of claim 1 wherein said sugar is a carbohydrate havbing a chain of 2 to 7 carbon atoms, with one of the carbon atoms carrying aldehydic or ketonic oxygen and the remaining carbon atoms bearing hydrogen atoms and hydroxyl groups.

4. The process of claim 3 wherein said sugar has a chain of 5 to 6 carbon atoms.

5. The process of claim 3 wherein said sugar is selected from the group consisting of glucous, fructose, sucrose, maltose, lactose and mixtures thereof.

6. The process of claim 1 wherein said mixture of alkaline earth compound and sugar contains about 0.05 to about 2.0 weight percent sugar.

7. The process of claim 1 wherein said mixture of alkaline earth compound and sugar is obtained by mixing the alkaline earth compound and sugar in the solid form.

8. The process of claim 1 wherein said mixture of alkaline earth compound and sugar is obtained by dissolving sugar in water, adding the alkaline compound thereto, and then drying the resulting slurry to remove water therefrom.

9. The process of claim 1 wherein said mixture of alkaline earth compound and sugar is obtained by dissolving sugar in water, converting the water to steam and then adding alkaline earth compound to the resulting gaseous mixture.

10. The process of claim 1 wherein said mixture of alkaline earth compound and sugar is obtained by adding alkaline earth compound and sugar to steam.

11. The process of claim 1 wherein said mixture of alkaline earth compound and sugar are in the form of particles having an average diameter below about 180 microns.

12. The process of claim 11 wherein said mixture of alkaline earth compound and sugar are in the form of particles having an average diameter in the range of about 2 to about 80 microns.

13. The process of claim 1 wherein said gaseous mixture is treated with said mixture of alkaline earch compound and sugar at a temperature of 100° to about 900° F.

14. The process of claim 1 wherein said gaseous mixture is treated with said mixture of alkaline earth compound and sugar so that the mols of alkaline earth compound relative to the mols of SO$_2$ in said gaseous mixture is in the range of about 1:1 to about 2:1.

15. The process of claim 1 wherein said contact is effected by spray injecting said mixture of alkaline earth compound and sugar into said gaseous mixture containing $SO_2$.

16. The process of claim 1 wherein said contact is effected by passing said gaseous stream containing $SO_2$ through a fluid bed containing alkaline earth compound and sugar.

17. The process of claim 1 wherein said contact is effected by passing said gaseous stream containing $SO_2$ through a fixed bed containing alkaline earth compound and sugar.

18. The process of claim 1 wherein the mixture of alkaline earth compound and sugar contains from about 0.05 to about 2 weight percent sugar, the temperature is in the range of about 100° to about 900° F., with the mols of said alkaline earth compound relative to the mols of $SO_2$ in said gaseous mixture being in the range of about 1:1 to about 2:1.

19. The process of claim 1 wherein said mixture of alkaline earth compound and sugar contains $Ca(OH)_2$, $Mg(OH)_2$ and sugar.

20. The process of claim 18 wherein said mixture of alkaline earth compound and sugar contains $Ca(OH)_2$, $Mg(OH)_2$ and sugar.

21. The process of claim 19 wherein said sugar is sucrose.

22. The process of claim 20 wherein said sugar is sucrose.

* * * * *